United States Patent [19]

Simon

[11] Patent Number: 5,195,058

[45] Date of Patent: Mar. 16, 1993

[54] ULTRASONIC METHOD FOR NON-INTRUSIVE LOW LIQUID LEVEL SENSING

[75] Inventor: Wayne E. Simon, Evergreen, Colo.

[73] Assignee: The United States of America as represented by the Secretary of the Air Force, Washington, D.C.

[21] Appl. No.: 876,246

[22] Filed: Apr. 30, 1992

[51] Int. Cl.$^5$ ............................................. G01S 15/02
[52] U.S. Cl. ..................................... 367/87; 367/908; 340/621
[58] Field of Search ............... 367/908, 87; 73/290 V; 340/621; 364/571.06

[56] References Cited

U.S. PATENT DOCUMENTS

| | | | |
|---|---|---|---|
| 4,203,324 | 5/1980 | Baumoel | 367/908 |
| 4,248,087 | 2/1981 | Dennis et al. | 73/290 V |
| 4,770,038 | 9/1988 | Zuckerwar et al. | 73/290 V |
| 4,821,569 | 4/1989 | Soltz | 73/290 V |
| 4,901,245 | 2/1990 | Olson et al. | 364/509 |

OTHER PUBLICATIONS

Unpublished paper of E. James Chern et al entitled "Ultrasonic Method for Nonintrusive Low-Liquid-Level Sening".
Unpublished paper of Eric Johnson.

Primary Examiner—Daniel T. Pihulic
Attorney, Agent, or Firm—Irwin Garfinkle; Donald J. Singer

[57] ABSTRACT

This disclosure concerns the application of the pulse echo principle to the non-intrusive method of low liquid level sensing to determine the level of a liquid in a container. Generally, the sensor is attached to an outer wall of a liquid container by means of an epoxy adhesive. An ultrasonic pulse is transmitted through from the sensor into the container and is reflected back through the epoxy adhesive and the container wall. The acoustic reflection coefficient for the container wall varies depending on whether the wall is backed by a liquid, the level of which is being determined. Specific integral equations which are provided to manipulate the data and to render the sensor less sensitive to noise, wall thickness and reflections from thin liquid levels.

2 Claims, 1 Drawing Sheet

BLOCK DIAGRAM OF THE ULTRASONIC NON-INTRUSIVE LOW-LIQUID LEVEL SENSING SYSTEM

BLOCK DIAGRAM OF THE ULTRASONIC NON-INTRUSIVE
LOW-LIQUID LEVEL SENSING SYSTEM

BASIC STRUCTURE OF THE ULTRASONIC LOW-LIQUID
SENSING SYSTEM (a) ULTRASONIC SIGNAL
RESPONSE
(WITH AIR BACKING)

(b) ULTRASONIC SIGNAL
RESPONSE
(WITH LIQUID BACKING)

ULTRASONIC METHOD FOR NON-INTRUSIVE LOW LIQUID LEVEL SENSING

STATEMENT OF GOVERNMENT INTEREST

The invention described herein may be manufactured and used by or for the Government for governmental purposes without the payment of any royalty thereon.

This invention concerns the application of the pulse echo principle to the non-intrusive method of low liquid level sensing to determine the level of a liquid in a container. Generally, the sensor is attached to an outer wall of a liquid container by means of an epoxy adhesive. An ultrasonic pulse is transmitted through from the sensor into the container and is reflected back through the epoxy adhesive and the container wall. The acoustic reflection coefficient for the container wall varies depending on whether the wall is backed by a liquid, the level of which is being determined. The invention concerns the use of specific integral equations which are provided to manipulate the data and to render the sensor less sensitive to noise, wall thickness and reflections from thin liquid levels.

BACKGROUND OF THE INVENTION

As pointed out in an unpublished paper of Chern, Djordjevic and Barnett, entitled Ultrasonic Method for Non-intrusive low liquid level Sensing (incorporated herein by reference and attached to the invention disclosure statement submitted with this application), the Physics and fundamental principles of ultrasonic pulse echo technology are well understood, and pulse echo techniques have been used widely for measurement of material properties such as modulus, stress and thickness, and for defect detection and flaw characterization. The Chern et al paper describes the application of the pulse echo principle to a non-intrusive method of low-liquid-level sensing for potential application in space systems. Chern et al point out that the ultrasonic approach to low-liquid sensing provides a viable alternative to conventional approaches which require penetration of the container wall and special designs to accommodate the sensor and to access the liquid.

In a second unpublished paper of Eric Johnson of Martin Marietta (incorporated herein by reference, a copy of which is attached to the information disclosure statement submitted with this application), the author refers to prior use of a method for determining when a launch vehicle liquid fuel tank is empty. As pointed out by the author, an Ultrasonic transducer (sender/receiver) is mounted on the outside wall of a fuel tank. If the tank is empty, a pulse train stimulated by the transducer is reflected back and forth between the inner and outer surfaces of the tank walls. This pulse train is attenuated each time it is reflected from the inner or outer surface of the material comprising the walls. The signal detected by the transducer is, therefore a decaying echo train. If, however the tank contains enough liquid to cover the section of the inner wall opposite the transducer, there is a greater attenuation of the pulse train. By comparing the attenuations of the pulse trains, a determination can be made as to when the tank is empty. However, the author points out, that if the fuel is dispensed very rapidly, as in liquid fuel rocket applications, a residual film may adhere to the tank wall and this film effect the determination of when the tank is empty.

It is noted that the Chern et al method requires the use of a peak detector which makes the detector fairly sensitive to noise in the frequency band being used, and second, if a time gate is used for the peak detector, the number of detected peaks depends on the thickness of the tank walls. It is also noted from the Johnson paper, that peak detection is enormously sensitive to wave interference in the presence of thin liquid layer, and, by inference, to other uncontrolled reflections. It is noted that the Johnson implementation of the sensor uses a logic circuit which requires four successive state determinations to be the same before the state of the liquid in the tank is determined to be correct.

In accordance with the invention described and claimed herein, I use a method which avoids the difficulties of the prior art by integrating the whole pulse train. As will be shown, the integral depends only on the transmitted pulse magnitude and duration, and on the loss experienced on each round trip. This integral method will detect the return signal and integrate for a fixed time sufficient to get all the return pulses of appreciable magnitude. The integral will be sensitive only to the amount of energy returning from the liquid, and independent of the wave interference is so devastating to a peak detector.

OTHER PRIOR ART

Search of the prior art revealed the following United States Patents:

The Olson et al U.S. Pat. No. 4,901,245 describes a nonintrusive acoustic liquid level sensor apparatus. The apparatus comprises an energy transceiving means, a driving means, a signal processing means and tuning means. The transceiving means is mounted to the bottom of a tank, and transmits a signal through the tank bottom wall. The signal is reflectable by a liquid surface in the tank. The transceiving means is also capable of receiving a reflection of the transmitted signal from the liquid surface. The signal processing means operates to process the reflected signal and locate the liquid surface in the tank.

The Soltz U.S. Pat. No. 4,821,569 describes an ultrasonic echo-ranging apparatus for measuring the changing level of liquid in a tank or open channel. The apparatus includes a transducer which is positioned above the liquid surface, and produces ultrasonic energy pulses. The pulses are directed toward and reflected by the liquid surface. The transducer receives the reflected pulses, and a counter and microcomputer determine the round trip transmit time of the pulse. The transmit time is then converted to provide a reading of liquid level in the tank. Means are provided to discriminate between parasitic and main echo pulses, and to eliminate the parasitic pulses as a factor.

The Zucherwar et al U.S. Pat. No. 4,770,038 describes an ultrasonic depth gauge apparatus which comprises a transducer and supporting electronics. The transducer is mounted into the bottom wall of a storage vessel with its resonating surface directly exposed to the liquid which is under pressure in the vessel. The transducer emits an ultrasonic pulse directly into the liquid. The pulse propagates upward through the liquid to the liquid-gas interface, where it is reflected. The reflected pulse is detected by the transducer, and the supporting electronics measure the round-trip transit time. The time measured is proportional to the depth of the liquid.

The Dennis et al U.S. Pat. No. 4,248,087 describes a system and method for determining fluid level in a container. Ultrasonic transmitting and receiving transducers are attached to the external wall of the container. The transducers are oriented so that the direction of propagation of the ultrasonic energy is normal to the container surface. Actuation of the transmitting transducer causes various modes of acoustic energy propagation to be excited in the walls of the container. One of the modes is a flexural mode of the container wall. The velocity at which the acoustic wave packet travels is dependent on the mass loading of the material in the container. As the liquid level varies in the tank, the mass loading on the wall of the tank will vary, and the travel time of the acoustic energy from transmitter to receiver will vary correspondingly. The flexural mode burst of acoustic energy is detected by the receiving transducer, and the travel time is determined. By detecting the change in travel time, the liquid level may be monitored.

OBJECTS OF THE INVENTION

It is an object of this invention to provide and improved method and means for non-intrusive low-liquid-level sensing.

Another object of this invention is to provide and ultrasonic liquid detector in which an ultrasonic pulse is transmitted through the wall of the liquid container, and the reflections are integrated.

These objects together with other objects, features and advantages of the invention will become more readily apparent from the following detailed description when taken in conjunction with the accompanying drawings wherein like elements are given like reference numerals throughout.

DESCRIPTION OF THE PREFERRED EMBODIMENT

Figure 1:
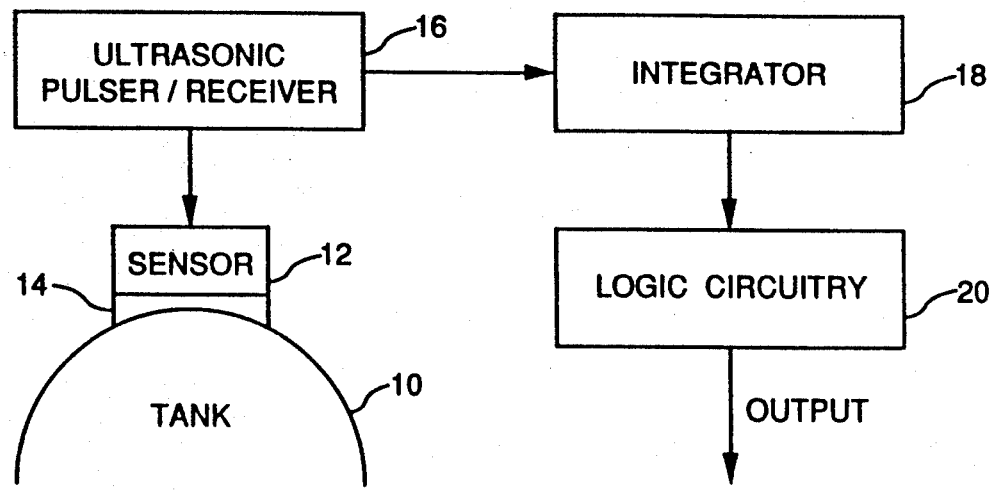
FIG. 1 is a block diagram of an ultrasonic non-intrusive low-liquid level sensing method in accordance with this invention.

Referring to FIG. 1, there is shown a tank 10 for containing a liquid, such as fuel for a rocket engine. The purpose of the invention is to accurately determine when the tank is empty. To this end, the fluid level detector system comprises a sensor 12 which is adhered to an outer wall of the tank 10 by means of an epoxy adhesive 14. The sensor is an ultrasonic transducer, preferably one capable of withstanding the environmental effects likely to be encountered in space applications, such a g-load, vibration, and thermal cycles. The adhesive 14 should also be selected to provide minimum attenuation of the ultrasonic pulse and to meet the adhesion requirements for space applications, and as reported by Chern et al, Versilok 202 TM to bond the sensor 12 to the tank 10.

The electronics for the system is shown in block diagram form and consists of an ultrasonic pulser/receiver 16. The pulses generated by the pulser portion of the circuitry are applied to the sensor to provide ultrasonic waves for introduction into the tank through the adhesive 14 and the wall of the tank 10. Reflections of the transmitted ultrasonic waves are processed by the receiver and the applied to an integrator 18. The output of the integrator is applied to Logic circuitry 20 which provides an indication of when the tank has been drained of the liquids contained therein.

Figure 2:
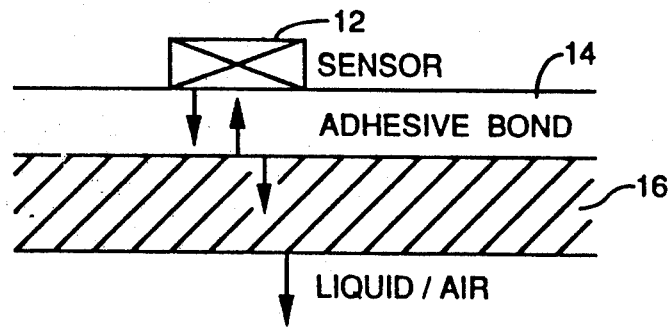
FIG. 2 illustrates the basic structure of the low-level-liquid sensing system.
Figure 3:
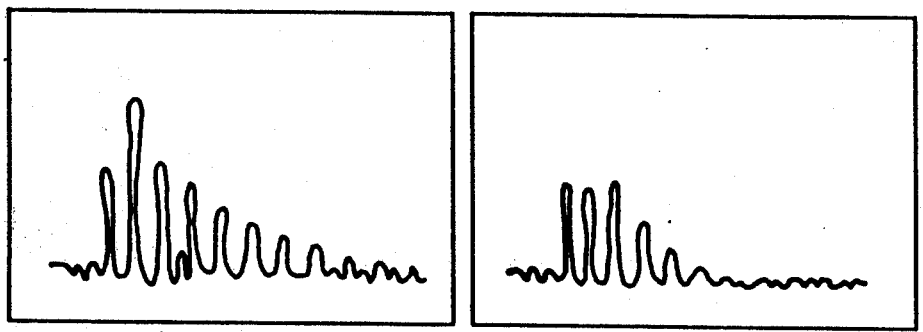
FIGS. 3a and 3b are typical oscilloscope tracings showing the response of the transducer when covered with liquid (2a) and when uncovered with liquid (2b).

The basic structure of the low-liquid level sensing system is shown in FIG. 2. As illustrated, a pulse is transmitted through two layers, the epoxy adhesive that bonds the sensor to the container wall, and the wall of the container. The acoustic reflection coefficient for the container wall varies depending on whether the liquid behind the wall is present or absent, and thus is an indicator of the level of the liquid within the container. Basically, this invention functions in a manner similar to that of Chern it al, but Chern et al measures the peaks of the reflected waves to determine the presence or absence of liquid. This invention is an improvement over Chern in the use of the integrator 18 which functions as follows:

Let $\tau$ = duration of an ultrasonic pulse
w = wall thickness
c = sound speed in wall
k = log decrement in magnitude for each return
m = magnitude of the transmitted pulse.

If: f = the returning signal
Then f can be approximated as follows:

$$f(t) \approx m \cdot 0^{-ktc/2w}, \text{if}(t \bmod 2w/c) < \tau$$

$$f(t) = 0, \text{otherwise}$$

Then:

$$\int_0^t f(u)du \approx \tau \frac{c}{2\omega} \cdot m \cdot 2 \frac{\omega}{ck} \int_0^{ktc/2\omega} e^{-\xi}d\xi$$

$$\int_0^t f(u)du \approx m \frac{\tau}{k}(1 - e^{-ktc/2\omega})$$

And $$\int_0^{6\omega/kc} f(u)du \approx m \frac{\tau}{k}$$

Thus, if the whole pulse train received by the receiver 16 is integrated, the integral depends only on the transmitted pulse magnitude and duration, and on the loss experience on each round trip k. This integral version of the Chern et al sensor will detect the return signal and integrate for a fixed time sufficient to get all the return pulses of appreciable magnitude. The integral sill be sensitive only to the amount of energy returning from the liquid, and independent of wave interference which is so detrimental to a peak detector of the type taught by Stern et al. The logic circuit establishes a threshold value such that when the integrated signals exceed the threshold, an output signal provides an indication that the tank is drained of liquid.

While the invention has been particularly described with reference to the preferred embodiments thereof, it will be understood by those skilled in the art that various changes in substance and form can be made therein without having departed from the spirit and the scope of the invention as detailed in the attached claims.

I claim:

1. A non-intrusive ultrasonic sensing system for determining the presence or absence of a liquid in a container, the combination comprising:
   a container having walls for containing a liquid;
   a transducer adhered to a wall of said container;
   means for transmitting an ultrasonic pulse from said transducer through said wall and for receiving the reflections of said transmitted pulse;
   means for integrating said reflections over a given period of time, said reflections being integrated in accordance with the following equation:

$$\int_0^{6\omega/kc} f(u)du \approx m\frac{\tau}{k}$$

where
m equals the magnitude of the transmitted pulse
$\tau$ equals the duration of the ultrasonic pulse
k equals the log decrement in magnitude for each return of the pulse
w equals wall thickness
c equals the speed of sound in the wall; and
means for indicating when said integrated reflections exceed a predetermined threshold.

2. The system of claim 1 wherein said transducer is adhered by means of an epoxy.

* * * * *